(12) United States Patent
Anno

(10) Patent No.: US 11,811,977 B2
(45) Date of Patent: Nov. 7, 2023

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Makoto Anno, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/838,751

(22) Filed: Jun. 13, 2022

(65) Prior Publication Data

US 2022/0303399 A1    Sep. 22, 2022

Related U.S. Application Data

(63) Continuation of application No. PCT/JP2020/044430, filed on Nov. 30, 2020.

(30) Foreign Application Priority Data

Jan. 9, 2020  (JP) ................................. 2020-002431

(51) Int. Cl.
  *G06F 3/12*   (2006.01)
  *H04N 1/00*   (2006.01)
  *G06K 15/02*  (2006.01)

(52) U.S. Cl.
  CPC ....... *H04N 1/00039* (2013.01); *G06F 3/1208* (2013.01); *G06F 3/1267* (2013.01); *H04N 1/00045* (2013.01); *H04N 1/0048* (2013.01)

(58) Field of Classification Search
  None
  See application file for complete search history.

(56) References Cited

U.S. PATENT DOCUMENTS

| 5,655,062 A * | 8/1997 | Tompkins ............... G06K 15/02 |
|   |   | 358/1.9 |
| 9,940,074 B1 | 4/2018 | Soriano et al. |

(Continued)

FOREIGN PATENT DOCUMENTS

| JP | 2002342046 | * 11/2002 | ......... G06K 15/1806 |
| JP | 2006163660 A | 6/2006 | |

(Continued)

OTHER PUBLICATIONS

International Search Report issued in Intl. Appln. No. PCT/JP2020/044430 dated Jan. 12, 2021. English translation provided.

(Continued)

*Primary Examiner* — Beniyam Menberu
(74) *Attorney, Agent, or Firm* — ROSSI, KIMMS & McDOWELL LLP

(57) ABSTRACT

The present information processing apparatus externally receives print data and a print quality criterion as a print job, analyzes the received print data, and extracts an object for which a print quality criterion can be designated. The information processing apparatus also analyzes the received print quality criterion and, based on a result of the analysis, determines whether or not a print quality criterion corresponding to the extracted object is designated in the received print quality criterion. The information processing apparatus also performs a predetermined notification if a print quality criterion corresponding to at least one extracted object is not designated in the received print quality criterion as a result of the determination.

8 Claims, 11 Drawing Sheets

(56) References Cited

U.S. PATENT DOCUMENTS

| | | | | |
|---|---|---|---|---|
| 2004/0047643 A1* | 3/2004 | Jackelen | ................ | G03G 15/50 |
| | | | | 399/81 |
| 2012/0086974 A1* | 4/2012 | Kiuchi | ............... | G06K 15/1802 |
| | | | | 358/1.15 |
| 2014/0211257 A1* | 7/2014 | Ishii | ..................... | G06F 3/1292 |
| | | | | 358/1.15 |
| 2015/0055172 A1* | 2/2015 | Iida | ................... | G06K 15/4065 |
| | | | | 358/1.15 |
| 2020/0019353 A1* | 1/2020 | Okajima | .............. | G06F 3/1257 |
| 2020/0159466 A1* | 5/2020 | Mosko | .................... | G06F 3/126 |
| 2020/0177746 A1* | 6/2020 | Katsumata | ......... | H04N 1/00403 |
| 2021/0362515 A1* | 11/2021 | Schmidt | ................... | B41J 3/546 |

FOREIGN PATENT DOCUMENTS

| | | | | | |
|---|---|---|---|---|---|
| JP | 2007527169 | * | 9/2007 | ........... | H04N 1/4092 |
| JP | 2008204225 | * | 9/2008 | ............... | G06T 1/00 |
| JP | 2014215953 A | | 11/2014 | | |
| JP | 2014235687 | * | 12/2014 | ............... | G06F 3/12 |
| JP | 2016212698 A | | 12/2016 | | |
| JP | 2017081032 A | | 5/2017 | | |
| JP | 2018133670 | * | 8/2018 | ............... | H04N 1/46 |
| JP | 2018185790 A | | 11/2018 | | |

OTHER PUBLICATIONS

English Translation of Written Opinion issued in Intl. Appln. No. PCT/JP2020/044430 dated Jan. 12, 2021. Previously cited on Jun. 13, 2022.

* cited by examiner

```xml
<PRX>
  <QualitySpecification>
    <CustomerJob>
      <QualityGoals>
        <Color>
          <ColorScore>
            <ScoringInfo>
              <MinimumAcceptableRank>3</MinimumAcceptableRank>
              <DesiredRank>4</DesiredRank>
            </ScoringInfo>
          </ColorScore>
          <ColorParameter>
            <ParameterName>SpotColorRed</ParameterName>
            <ScoringInfo>
              <SamplingPosition>
                <SamplingPositionImageIdLink>CP1a</SamplingPositionImageIdLink>
              </SamplingPosition>
              <CxFReferenceObjectIdLink>CxF001</CxFReferenceObjectIdLink>
            </ScoringInfo>
          </ColorParameter>
        </Color>
      </QualityGoals>
    </CustomerJob>
  </QualitySpecification>
</PRX>
```

410

```xml
<BarcodeParameter>
  <BarcodeSymbology>JAN</BarcodeSymbology>
  <SamplingPosition>
    <SamplingPositionImageIdLink>BC2</SamplingPositionImageIdLink>
  </SamplingPosition>
</BarcodeParameter>
```

FIG. 5

```xml
<PRX>
  <CxFReferenceData>
    <cc:CxF>
      <cc:Resources>
        <cc:ObjectCollection>
          <cc:Object Name="1" Id="CxF001" ObjectType="Target">
            <cc:ColorValues>
              <cc:ColorCIELab ColorSpecification="CS1">
                <cc:L>17.64166</cc:L>
                <cc:A>1.076666</cc:A>
                <cc:B>0.338566</cc:B>
              </cc:ColorCIELab>
            </cc:ColorValues>
          </cc:Object>
        </cc:ObjectCollection>
      </cc:Resources>
    </cc:CxF>
  </CxFReferenceData>
  <SamplingPositionImageData>
    <SamplingPositionImageIdLink Id="CP1a" ImageLink="ColorPosition1a.jpg"/>
  </SamplingPositionImageData>
</PRX>
```

500

```xml
<SamplingPositionImageData>
  <PositionLocationImage Id="BC2" ImageLink="barcode.pdf"/>
</SamplingPositionImageData>
```

510

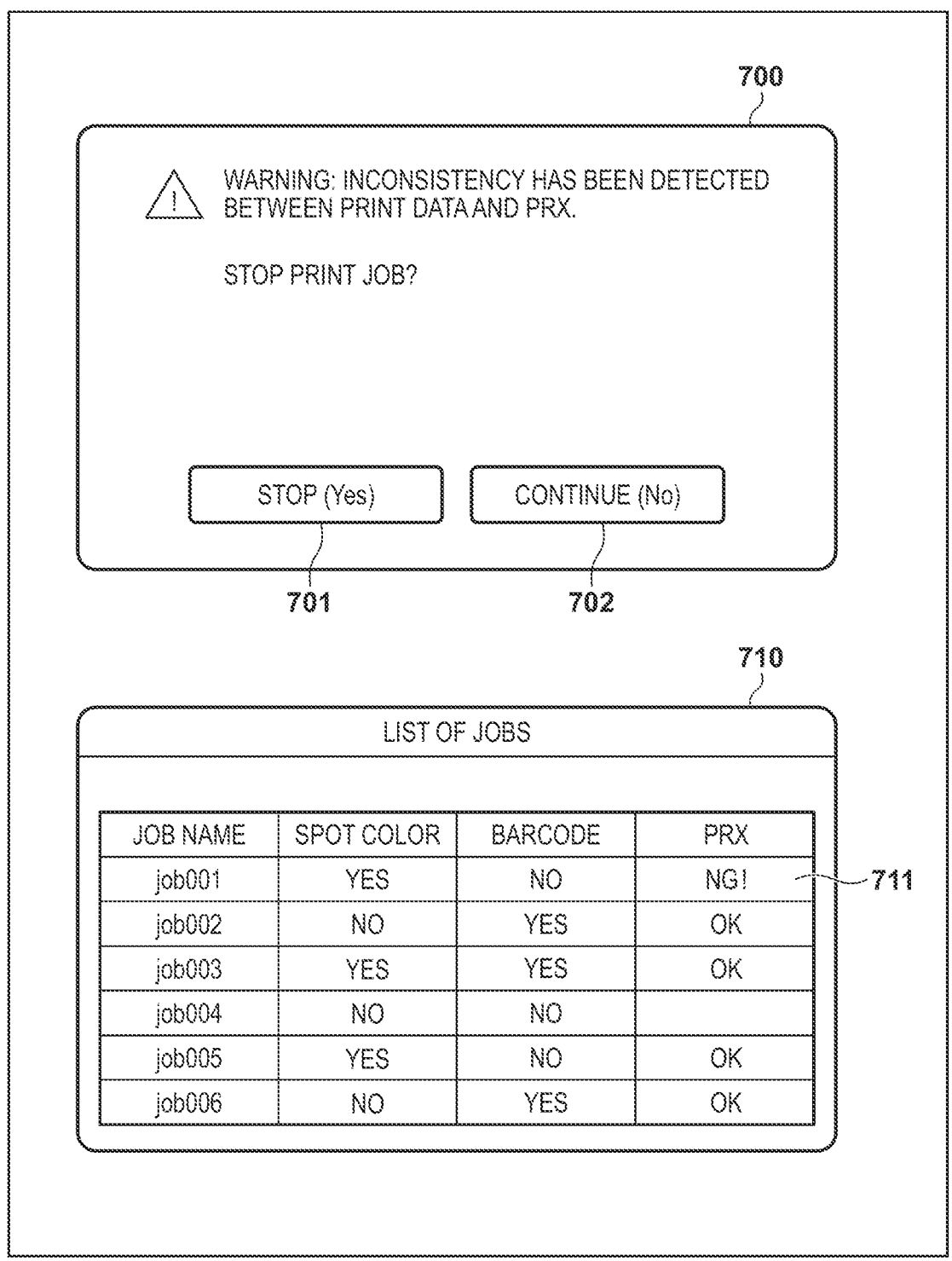

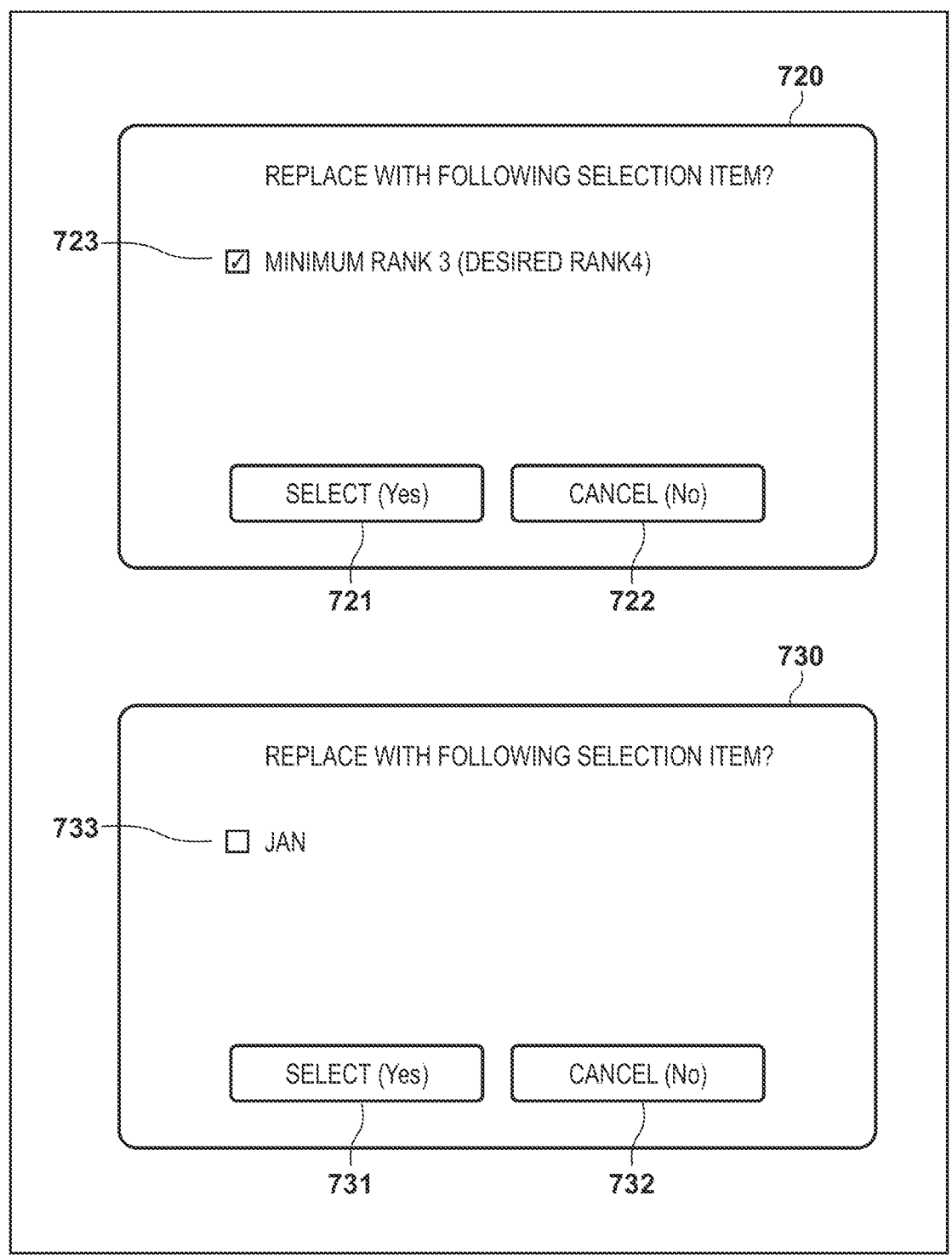

FIG. 8

```
<prepress_result>
    <print_data_name>job001</print_data_name>
    <colorspace>
        <ColorCIELab color_name=sc01>
            <cc:L>17.64167</cc:L>          ⎫
            <cc:A>1.076669</cc:A>          ⎬ 802
            <cc:B>0.3338588</cc:B>         ⎭
        </ColorCIELab>
        <ColorRGB color_name=sc02>
            <R>85</R>                       ⎫
            <G>170</G>                      ⎬ 803
            <B>119</B>                      ⎭
        </ColorRGB>
    </colorspace>
    <font>
        <font_type font_name=courier>courier</font>  } 804
        <font_type font_name=barcode>JAN</font>      } 805
    </font>
</prepress_result>
```
801

INFORMATION PROCESSING APPARATUS, CONTROL METHOD THEREOF, AND STORAGE MEDIUM

CROSS-REFERENCE TO RELATED APPLICATIONS

This application is a Continuation of International Patent Application No. PCT/JP2020/044430, filed Nov. 30, 2020, which claims the benefit of Japanese Patent Application No. 2020-002431, filed Jan. 9, 2020, both of which are hereby incorporated by reference herein in their entirety.

BACKGROUND OF THE INVENTION

Field of the Invention

The present invention relates to an information processing apparatus for managing the quality of print products, a control method thereof, and a storage medium.

Background Art

There are print service formats called print on demand (POD), production printing, and commercial printing. In these service formats, there is a customer (also referred to as an end user) who orders or requests printing and a printing company that provides a print product, and the customer orders the print product by providing the printing company with a specification of the print product that the customer is requesting, and if necessary, image data used in printing. The specification of the print product is an element that decides the print product content such as a type of sheet to use, a finishing setting like binding and stapling, or a number of sheets or copies to be printed. The printing company uses the requested content and image data, creates the print product, then delivers it to the customer.

In these commercial printing services, the printing company uses various devices and software in everything from receiving orders to delivering a print product. In addition to a printing apparatus for printing on a sheet, a finisher for binding/stapling, and an inspection apparatus for examining/inspecting a print product being used, a web server for receiving an order for a print product from a customer and a terminal and software for managing print product production are also used. Also, there are a plurality of users of these devices and software. For example, an order receiver who manages orders and contacts customers, a process designer who designs operation processes for completing print products, an operator who operates printing or inspection apparatuses, and a checker who checks the quality of the final print product. There are printing companies that have a plurality of production sites, and in such a case, the printing companies, based on order content, decide at which production site to produce print products.

In commercial printing services, the printing companies are often assigned quality conditions for print products by the customers. The quality conditions are different from the specifications of print products, and indicate conditions related to the quality of print products such as a position deviation amount of an image between the front and back side of a sheet or an amount of variation in a color values of an image across a plurality of copies or pages. There are various print products such as distribution items like flyers and pamphlets, photo albums, books, business cards, and exhibition panels, and because their uses and prices vary, their quality conditions also vary in their required conditions and standards. As described later, because the printing companies, regarding the quality conditions, need an operation process for satisfying those conditions and a process for checking the quality of print products, generally, the higher the quality condition standard, the higher the cost of print products. The printing companies generate print products while performing various adjustment operations to satisfy these quality conditions. For example, all sorts of adjustments are made on a printing apparatus for matching a spot color on a specific sheet and print products that do not meet the quality conditions are removed as a defective product in the post-print inspection based on a sample printing result for which a customer's agreement has been obtained. The printing companies, through these operations, confirm whether the quality of print products that was achieved satisfies the quality conditions that the customers are seeking.

Particularly, when receiving orders for print products with various specifications/quality conditions from many customers, there will also be many kinds of operations for satisfying the quality conditions of the customers for each print product, and an amount of time required will be long. For example, it is assumed that a print product A is required to not have print misalignment between the front and back sides and a print product B is required to have consistency with a color sample provided by a customer as quality conditions. In this case, an order receiver needs to send each print product quality condition to a process designer using a data format that is used in the printing company. The process designer, based on a type and state of printing apparatuses and software that can be used in the printing company, decides an operation process for satisfying the quality condition in the production of each print product. Operations are decided so that for example, for the print product A, a device of the post-processing apparatus is adjusted and for the print product B, a printing apparatus is color-proofed, and additionally, result confirmation operations for each operation such as post-color-proofing colorimetry are decided. Also, means for confirming the quality, which indicate how to confirm whether the produced print products satisfy the quality conditions is decided, such as a portion on which to confirm print misalignment between the front and back sides and a maximum value of a permitted misalignment amount. Generally, a plurality of printing apparatuses are used in printing companies, so a process designer needs to choose the most appropriate apparatus from the plurality of printing apparatuses in order to satisfy the quality conditions of print products for which orders were received. As described above, a production of print products that satisfy the quality conditions and a definition of a workflow for checking the quality of the produced print products are necessary in a printing company. An operator receives the operation process decided as described above, then performs an operation of the printing apparatus and the software. A checker checks the produced print product and whether the print product satisfies the quality conditions based on the means for confirming the quality. As described above, the printing companies spend a lot of man-hours on quality conditions and the operation processes for satisfying those conditions.

Conventionally, a unified information format had not been defined or used for when customers and printing companies send and receive quality conditions. Thus, the printing companies would receive the quality conditions in different information formats from a plurality of customers, and inconvenience would arise when operation processes were being designed from the quality conditions to satisfy the conditions. Even from the customer-side perspective, it was complicated to send the quality conditions in different information formats when placing an order for print products to a plurality of printing companies.

Accordingly, in order to unify the information format for transmitting quality conditions, a PRX has been considered as a standardization technology. The PRX stands for a print requirement exchange format and indicates a standardized data format for quality conditions required for printing. By using the PRX, the quality conditions for different customers or different orders can be written in a unified and standardized data format. As described above, quality conditions which were conventionally not unified will be enabled for transmission in a unified information format using the PRX.

By using the PRX that describes the quality conditions that customers are seeking, the operation process performed when producing print products for satisfying the quality conditions and the operation process for checking the quality of the print products can be established in a printing system without an intervention by the operator. In other words, presetting of printing apparatuses and software can be performed automatically.

Japanese Patent Laid-Open No. 2014-215953 proposes a mechanism that sets a printing condition for contents viewed by a content viewer according to the printing conditions that a registrant of the content has set. In this case, if the printing conditions set by the registrant are satisfied, the print job is inputted to a predetermined printing apparatus.

However, there is a problem in the foregoing conventional technique as is described below. The quality conditions for print products described earlier are of a variety depending on the customer or the print product, and therefore, there may be many methods for achieving them. For example, as a quality condition, it is assumed that a customer has requested a high level of color reproducibility and stability regarding a corporate color used in a corporate logo. Color reproducibility is a scale for indicating whether colors expressed in definitions such as RGB or Lab (a color space that is expressed in coordinates—L for the dimension of lightness and a and b for the dimensions of complementary colors) in print data provided by the customer are printed in the same color on the print product. Stability is a scale for indicating whether print data whose color is the same has been printed without a change in its color across the print product when printing a plurality of pages or copies. Because corporate colors are colors that symbolize a company/organization, the customers often request high color reproducibility and stability as a quality condition, in other words, that the color is printed in the same color as the print data provided by the customer and that the result does not change in any page. Criteria for the quality of barcode printing are defined, for example, by an ISO standard so that errors do not occur when printed barcodes are read by handheld scanners. It is often requested as a quality condition for a print product that these standards are satisfied.

As described above, the operation process for satisfying the quality condition requested by customers varies depending on the print product specifications and the quality conditions requested by the customers. Using the PRX format described earlier, it becomes possible to input quality requirements for print product orders received from customers for every print job order received in a digital format.

However, at this time, when a customer designates quality requirements for a print product in a PRX, there may be inconsistencies between objects of print data and quality requirements therefor. For example, there often are cases where a customer requests that a printing company modify a spot color of a company logo to be used in print data when the spot color is not as the customer desired when the customer confirms a print proof outputted by press proofing or prepress proofing before the actual printing. In response to that request, the printing company modifies the spot color data of the company logo in the print data and repeats proof printing, customer confirmation and modification until the customer's requirements are met. After such a process, despite having changed the RGB or Lab values of the spot color data of the print data, it may be forgotten to change the RGB or Lab values of the spot color data in a PRX. As a result, the RGB or Lab values of the spot color data in the PRX become different from those of the spot color data of the print data. Alternatively, a sales representative who has received a job from a customer may simply forget to set a print quality criterion for a spot color, a barcode, or the like. In this way, when there are inconsistencies between print data and a PRX—specifically, when there is an object in print data but there is no corresponding print quality criterion in a PRX, it is not possible to appropriately reflect the customer's quality requirements, so it is necessary to perform appropriate error processing.

SUMMARY OF THE INVENTION

The present invention has been made in view of at least one of the above problems and provides a mechanism for detecting, when there is an object in print data for which a print quality criterion is to be set but there is no corresponding requirement criterion in a print request, that inconsistency and outputting a warning.

One aspect of the present invention provides an information processing apparatus comprising: a reception unit configured to externally receive print data and a print quality criterion as a print job; a prepress unit configured to analyze the print data received by the reception unit and extract an object for which a print quality criterion can be designated; an analysis unit configured to analyze the print quality criterion received by the reception unit; a determination unit configured to determine, based on a result of analysis by the analysis unit, whether or not a print quality criterion corresponding to the object extracted by the prepress unit is designated in the print quality criterion received by the reception unit; and a notification unit configured to perform a predetermined notification in a case where a print quality criterion corresponding to at least one object extracted by the prepress unit is not designated in the print quality criterion received by the reception unit as a result of determination by the determination unit.

Another aspect of the present invention provides a method of controlling an information processing apparatus, the method comprising: externally receiving print data and a print quality criterion as a print job; performing prepressing in which the received print data is analyzed and an object for which a print quality criterion can be designated is extracted; analyzing the received print quality criterion; determining, based on a result of the analyzing, whether or not a print quality criterion corresponding to the object extracted by the prepressing is designated in the received print quality criterion; and performing notification of a predetermined notification in a case where a print quality criterion corresponding to at least one object extracted by the prepressing is not designated in the received print quality criterion as a result of the determining.

Still another aspect of the present invention provides a non-transitory computer-readable storage medium storing a program for causing a computer to execute a method of controlling an information processing apparatus, the method comprising: externally receiving print data and a print quality criterion as a print job; performing prepressing in which the received print data is analyzed and an object for which a print quality criterion can be designated is extracted; analyzing the received print quality criterion; determining, based on a result of the analyzing, whether or not a print quality criterion corresponding to the object extracted by the prepressing is designated in the received print quality criterion; and performing notification of a predetermined notification in a case where a print quality criterion corresponding to at least one object extracted by the prepressing is not designated in the received print quality criterion as a result of the determining.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a diagram of quality requirement parameters of a PRX analysis result according to the embodiment.

FIG. 5 is a diagram of quality requirement parameters of a PRX analysis result according to the embodiment.

FIG. 7A is a diagram of screen displays of a workflow management terminal according to the embodiment.

FIG. 7B is a diagram of screen displays of the workflow management terminal according to the embodiment.

FIG. 8 is a diagram of a result of processing by a prepress processing unit according to the embodiment.

DESCRIPTION OF THE EMBODIMENTS

Figure 1:
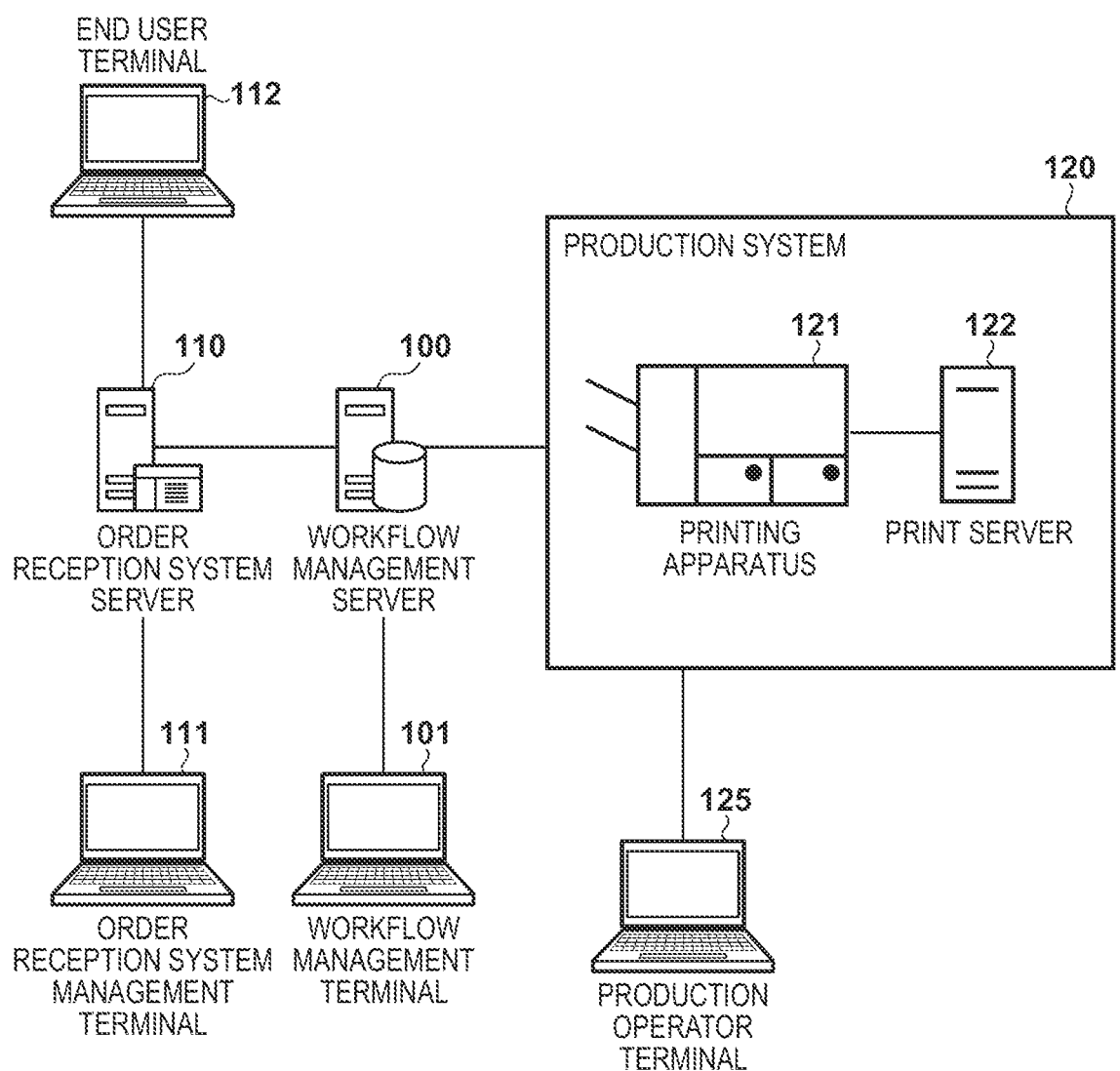
FIG. 1 is a diagram illustrating an example of a configuration of a system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A description will be given using a multi function peripheral (digital multi function peripheral/MFP) as an example of an image formation apparatus according to embodiments. However, the scope of application is not limited to a multi function peripheral, and the apparatus need only be an image formation apparatus having a printing function. In particular, although a description will be given assuming a PRX as the format of a file that defines the quality conditions for a print job, the present invention is not limited to a PRX, and any format may be used as long as a file defines the quality conditions for a print job. Hereinafter, when "PRX" is referred to, it indicates quality requirements defined using a PRX format.

<System Configuration>

Hereinafter, an embodiment of the present invention will be described. First, a configuration of a commercial printing system according to the present embodiment will be described with reference to FIG. 1. The system is configured to include a workflow management server 100, a workflow management terminal 101, an order reception system server 110, an order reception system management terminal 111, an end user terminal 112, a production system 120, and a production operator terminal.

The workflow management server 100 is an apparatus for managing an overall workflow related to processing of a print job. The workflow management terminal 101 is a terminal that is operated by a workflow administrator, connects to the workflow management server 100 via a network, executes various functions, receives information from the workflow management server 100, and displays the information. More specifically, the workflow management terminal 101 changes workflow management function settings, confirms the state of devices of the production system 120, displays information related to inconsistencies between print data and a PRX, for example.

The order reception system server 110 is an apparatus for managing a system for receiving orders from an end user for commercial printing goods. The order reception system management terminal 111 is a terminal operated by an order reception system administrator, connects to the order reception system server 110 via a network, and executes each function of the order reception system server 110. The end user terminal 112 is a terminal operated by an end user and an order for a job is placed from this terminal to the order reception system.

The production system 120 is a system for producing goods (products) in commercial printing. Specifically, the production system 120 is configured by apparatuses such as a printing apparatus 121 and a print server 122 for controlling the printing apparatus 121. The print server 122 may be provided to be integrated with the printing apparatus 121. Further, the production system 120 may be configured to include a post-processing apparatus having a function related to bookbinding or the like. The print server 122 performs printing processing based on data and instructions from the workflow management server 100 and issues printing instructions to the printing apparatus 121. The printing apparatus 121 executes printing based on data and instructions from the print server 122. The printing method is not particularly limited and may be any of an electrophotographic method, an inkjet method, and other methods.

A production operator terminal 125 is a terminal operated by an operator who operates various devices of the production system 120, connects to the production system 120 via a network, and has functions such as confirmation of the operation states of devices and confirmation of error information for when there is an error. As another form, a configuration may be taken so that a UI operation unit provided in each device, rather than an external terminal, is responsible for these functions.

Here, a flow from when the commercial printing system receives an order to when it prints a print job will be described.

First, an end user connects to the order reception system server 110 via a network from the end user terminal 112 and gives instructions for the selection of a product, which is a print product, transmission of document data, order placement, and the like to the order reception system server 110 via a UI such as a web browser. By this, an order for a print job can be placed. Since one or more end users place one or more print job orders, the order reception system server 110 holds order data for one or more print jobs.

Next, an order reception system administrator connects to the order reception system server 110 that holds the order data of one or more print jobs by using the order reception system management terminal 111 and executes the functions of the order reception system server 110 via a UI such as a web browser. Specifically, there are setting of requested quality for each product, confirmation of status of each ordered job, and viewing of product quality information on each ordered job, and the like.

Next, the workflow administrator connects to the workflow management server 100 using the workflow management terminal 101 and executes the functions of the workflow management server 100 via a UI such as a web browser. Specifically, the workflow management server 100 connects to the order reception system server 110, selects print jobs to be executed today from a plurality of held print jobs, acquires order data, and stores it in a memory or the like. The workflow management server 100 receives, from the order reception system server 110, print data and PRXs which are quality condition information. The workflow management server 100 interprets the PRXs received from the order reception system server 110 and executes determination of the production system 120 for each ordered job, prepress processing of print data, and the like. In the present embodiment, processing for preparing print data by inspecting fonts, spot colors, and the like used in print data before the printing apparatus 121 performs print output such that printing is performed without problems is referred to as prepress processing. In the prepress processing, it is analyzed whether there is an object for which a print quality criterion can be designated in print data externally received. By performing this processing, it is possible to analyze obtained order data, determine whether conditions for enabling printing is satisfied, and instruct the production system 120 to print what has been determined as printable.

Further, when the workflow management server 100 instructs the production system 120 to perform print output, the print server 122 receives print data and performs data processing, commonly referred to as RIP, so that the print data can be printed on a printing press. Thereafter, the print server 122 transmits the processed data to the printing apparatus 121. The printing apparatus 121 receives the data and performs print output.

The above-described processing is the flow from order reception until printing of a print job by this commercial printing system. Although the present embodiment will be described assuming that the workflow management server 100 is an on-premises server installed at a site where workflow management is performed, the present invention is not limited to this. As another embodiment, a configuration may be taken such that the workflow management server 100 is set up as a cloud server and is connected to via the Internet from the workflow management terminal 101, which will be described later. The same applies to the order reception system server 110 to be described later.

Further, although the present embodiment will be described assuming that the workflow management server 100 executes PRX interpretation and prepress processing of print data, the present invention is not limited to this. As another embodiment, they may be executed by the order reception system server 110, which will be described later, or by the print server 122 of the production system 120, which will be described later. PRX interpretation and prepress processing of print data may be performed on another server. For example, the order reception system server 110 may execute PRX interpretation and the workflow management server 100 may execute prepress processing.

<Hardware Configuration of Each Apparatus>

Figure 2:
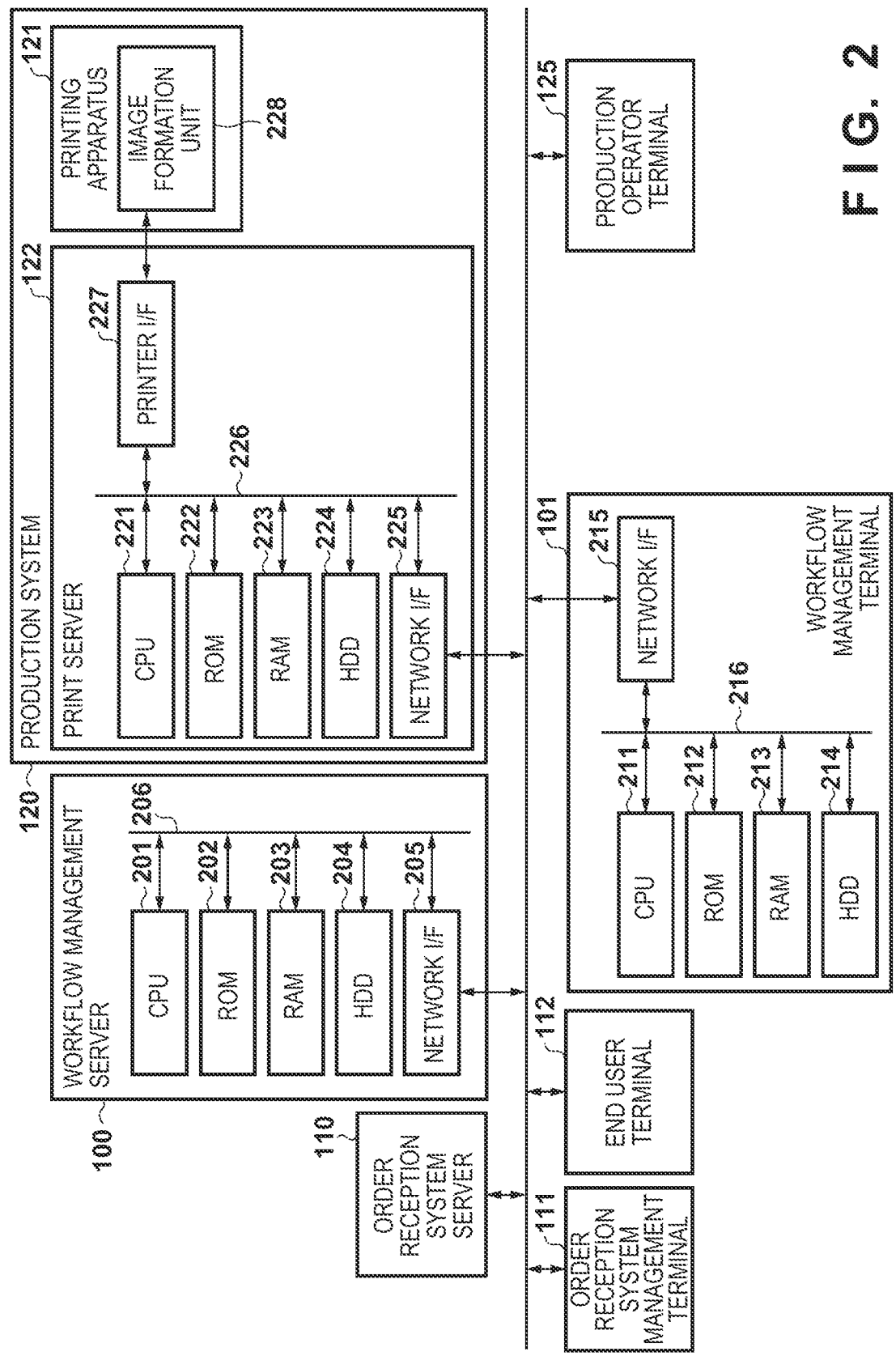
FIG. 2 is a diagram illustrating an example of a configuration of hardware according to the embodiment.

Next, a hardware configuration of each apparatus according to the present embodiment will be described with reference to FIG. 2. FIG. 2 illustrates a hardware configuration of the commercial printing system including a detailed configuration of the workflow management server 100, the workflow management terminal 101, and the print server 122 according to the present embodiment.

First, a hardware configuration of the workflow management server 100 will be explained. The workflow management server 100 comprises a CPU 201, a ROM 202, a RAM 203, an HDD 204, and a network I/F 205. The CPU 201 deploys in the RAM 203 a control program stored in the ROM 202 or the hard disk (HDD) 204, executes that deployed program, and collectively controls access to all sorts of devices connected to a system bus 206. The ROM 202 stores, for example, the control program that the CPU 201 is able to execute. The RAM 203 mainly functions as a main memory, a work area, or the like, of the CPU 201 and is configured such that a memory capacity can be extended by an option RAM 203 connected to an expansion port (not illustrated). The hard disk drive (HDD) 204 stores an executable control program, a boot program, all sorts of applications, font data, a user file, and an edit file. Note that although the HDD 204 is used in the present embodiment, an SD card, a flash memory, an SSD, an eMMC, or the like may be used as an external storage unit besides the HDD. The same applies to apparatuses comprising an HDD described hereinafter. The network I/F 205 performs data communication with all sorts of apparatuses, which are external apparatuses, via the network. Note that because the hardware configuration of the order reception system server 110 is the same as that of the workflow management server 100, the description will be omitted.

Next, a hardware configuration of the workflow management terminal 101 will be explained. The workflow management terminal 101 comprises a CPU 211, a ROM 212, a RAM 213, an HDD 214, and a network I/F 215. The CPU 211 deploys in the RAM 213 a control program stored in the ROM 212 or the hard disk (HDD) 214, executes that deployed program, and collectively controls access to all sorts of devices connected to a system bus 216. The ROM 212 stores, for example, the control program that the CPU 211 is able to execute. The RAM 213 mainly functions as a main memory, a work area, or the like, of the CPU 211 and is configured such that a memory capacity can be extended by an option RAM 213 connected to an expansion port (not illustrated). The hard disk drive (HDD) 214 stores a boot program, all sorts of applications, font data, a user file, and an edit file. The network I/F 215 performs data communication with other apparatuses via the network. Note that because the hardware configuration of other terminal apparatuses such as the order reception system management terminal 111, the end user terminal 112, and the production operator terminal 125 are the same as that of the workflow management terminal 101, the description will be omitted.

Next, a hardware configuration of the print server 122 will be explained. The print server 122 comprises a CPU 221, a ROM 222, a RAM 223, an HDD 224, and a network I/F 225. The CPU 221 deploys in the RAM 223 a control program stored in the ROM 222 or the hard disk (HDD) 324, executes that deployed program, and collectively controls access to all sorts of devices connected to a system bus 226. The ROM 222 mainly stores, for example, the control program that the CPU 221 is able to execute. The RAM 223 mainly functions as a main memory, a work area, or the like, of the CPU 221 and is configured such that a memory capacity can be extended by an option RAM connected to an expansion port (not illustrated). The hard disk drive (HDD) 224 stores an executable control program, a boot program, all sorts of applications, font data, a user file, and an edit file. The network I/F 225 performs data communication with other apparatuses via the network. A printer I/F 227 controls image output to an image formation unit 228 of the printing apparatus 121.

Next, a hardware configuration of the printing apparatus 121 will be explained. The printing apparatus 121 includes at least the image formation unit 228. The image formation unit 228 outputs print data on a sheet, and a hardware configuration thereof is the same as that of a typical printing apparatus. Although the printing apparatus 121 also includes hardware other than the image formation unit 228, a description thereof will be omitted because it is not directly related to the present invention and is not different from that of a typical printing apparatus.

<Software Configuration of Workflow Management Server>

Figure 3:
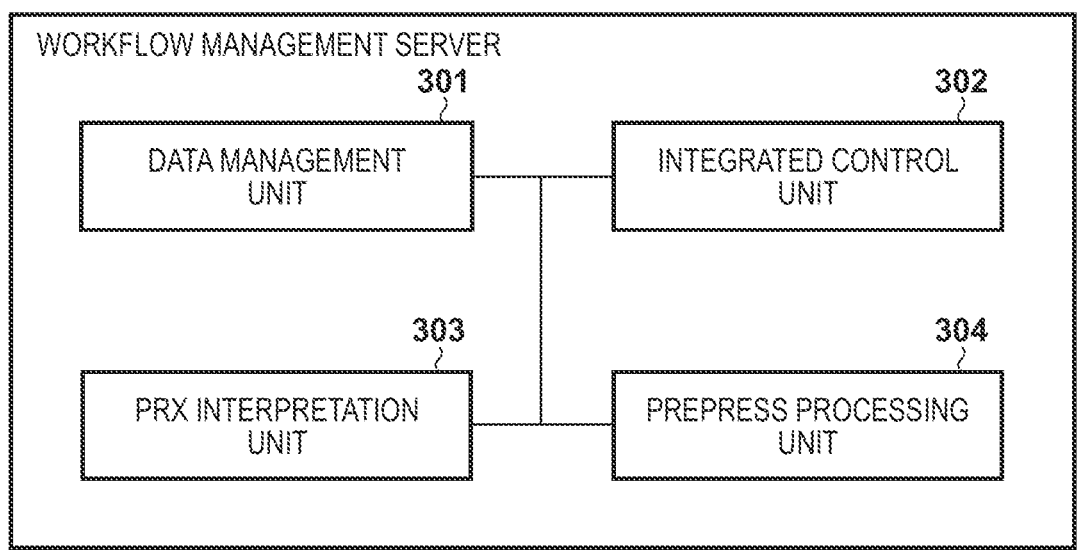
FIG. 3 is a diagram illustrating an example of a configuration of software according to the embodiment.

Next, a software configuration of the workflow management server 100 according to the present embodiment will be described with reference to FIG. 3. These software modules are realized by the CPU 201 reading a program stored in the ROM 202 or the HDD 204 and deploying and executing it in the RAM 203. The workflow management server 100 includes, as a software configuration, a data management unit 301, an integrated control unit 302, a PRX interpretation unit 303, and a prepress processing unit 304.

The data management unit 301 receives print data and a PRX (quality requirement) from the order reception system server 110 and manages them. The integrated control unit 302 reads the PRX and the print data from the data management unit 301, analyzes the PRX and the print data, analyzes whether there are inconsistencies between the PRX and the print data in accordance with a flowchart to be described later and records the result thereof in a log file. The log file is managed by the data management unit 301. The PRX interpretation unit 303 analyzes the PRX received from the order reception system server 110 and then specifies print quality conditions. The prepress processing unit 304 analyzes the print data received from the order reception system server 110.

Although the present embodiment will be described assuming that the workflow management server 100 has the PRX interpretation unit 303 and the prepress processing unit 304 for executing prepressing of print data, there is no intention to limit the present invention. As another embodiment, they may be included in the order reception system server 110 or the print server 122 of the production system 120.

<PRX>

Next, examples of a PRX description will be described with reference to FIGS. 4 and 5. A reference numeral 400 in FIG. 4 illustrates, as an example regarding "color", an example in which quality requirements for a spot color defined as "SpotColorRed" by the end user is designated using a PRX.

ColorScore is configured by fields that define the parameters of quality requirements for color. ScoringInfo has both MinimumAcceptableRank and DesiredRank, both of which define a level of color quality. MinimumAcc eptableRank is the minimum level of quality to be ensured and is level 3 here, and DesiredRank is a desired level of quality to be achieved and is level 4 here.

ColorParameter is configured by fields that define the parameters of quality requirements for "color". ParameterName represents the name of a quality requirement and is "SpotColorRed" here. SamplingPosition represents information on a location of an object in print data. SamplingPositionImag eIdLink represents the ID name of an object as a link to a spot color object in print data and is "CP1a" here. Further, CxFReferenceObjectIdLink represents a link to a data set representing target color information for an object by using an ID and is "CxF001" here.

A reference numeral 500 in FIG. 5 is a data set associated by CxFReferen ceObjectIdLink of the PRX 400. CxFReferenceData defines a color whose cc:Object Name is "1" and id is "CxF001". That color is defined in cc:ColorValues and is defined using Lab, which is a type of color space. Here, L=17.64166, a=1.076666, and b=0.3338566. Further, SamplingPositionImag eData indicates the name of an object of a color defined in SamplingPositionImag eIdLink. Here, it is indicated that a SamplingPositionImageIdLink ID is "CP1a" and the link destination thereof is "ColorPosition1a.jpg". With the above, it is designated in the PRX that there are Lab values and an object name based on the color ID name and the link name thereof.

In a reference numeral 410 in FIG. 4, as an example for a "barcode", a description will be given for a case where an end user designates a quality requirement for a two-dimensional barcode using a PRX. BarcodeSymbology represents a barcode type, and here, it is indicated that a barcode standard "JAN" (Japanese Article Number) is followed. SamplingPositionImageIdLink represents a link ID for an image information data set for an object and is "BC2" here.

A reference numeral 510 in FIG. 5 is a data set associated by SamplingPo sitionImageData. and image information associated to a PositionLocationImage ID BC2 is "barcode.pdf".

With the above, it is designated in the PRX that the barcode of this example is of the type JAN and the object name is barcode.pdf.

Terms such as ColorParameter, formats, and the like of a PRX described here are examples and may be subject to change when the PRX standard is revised. Even in such cases, the color and barcode described above may be defined using terms and formats corresponding to a version of the PRX standard.

<Analysis Result>

Referring now to FIG. 8, a result of analysis for when the prepress processing unit 304 of the workflow management server 100 analyzes print data will be described. A reference numeral 801 indicates a result of analysis in an XML format.

The print_data_name indicates the name of print data, which is "job001" here. When spot color data is included, it is indicated in colorspace. For example, as indicated in a reference numeral 802, if there is a spot color expressed in CIELab values, it is indicated in ColorCIELab; here, the name of a spot color is "sc01", and the Lab values are L=17.64167, a=1.076669, and b=0.3338588. In addition, as indicated in a reference numeral 803, another spot color is also detected; the name is "sc02" and the RGB values are R=85, G=170, and B=119. If embedded fonts are detected, they are indicated in font. For example, it is indicated that two font types have been detected in the print data: the font type "courier" with the name courier as indicated in a reference numeral 804, and the font type "JAN" with the name barcode as indicated in a reference numeral 805.

<Processing Procedure>

Next, the flow of operation of the workflow management server 100 according to the present embodiment will be described with reference to FIGS. 6A and 6B. The processing to be described below is realized, for example, by the CPU 201 reading a program stored in the ROM 202 or the HDD 204 and deploying and executing it in the RAM 203.

When the workflow management server 100 receives a PRX and print data from the order reception system server 110 via the network I/F 205, this flowchart starts. In step S601, the integrated control unit 302 stores a print job configured by the received PRX and print data in the data management unit 301 and, from there, transmits the print data to the prepress processing unit 304 and the PRX to the PRX interpretation unit 303. The prepress processing unit 304 analyzes the print data and then transmits the result of analysis to the data management unit 301. An example of the result of analysis is illustrated in FIG. 8. Next, in step S602, the integrated control unit 302 analyzes the result of analysis transmitted to the data management unit 301, determines whether there is a spot color or barcode in the print data, and if present (Yes), proceeds to step S603, and if not present (No), proceeds to step S617. Here, the print data is analyzed to determine whether or not an object for which the print quality criterion can be designated exists in the received print data. As for the barcode, if the prepress processing unit 304 cannot analyze the barcode object itself, it may alternatively be determined whether or not the barcode font is embedded in the font as illustrated in FIG. 8.

In step S603, the PRX interpretation unit 303 analyzes the PRX and transmits the result of analysis to the data management unit 301. When the PRX as described in FIGS. 4 and 5 is analyzed, a spot color and a barcode designated therein can be detected. Next, in step S604, the integrated control unit 302 analyzes the result of analysis transmitted to the data management unit 301, determines whether there is a spot color and a barcode in the PRX, and if present (Yes), proceeds to step S605, and if not present (No), proceeds to step S606.

In step S606, the integrated control unit 302 compares the results of analysis of the PRX and the print data, and determines whether target print quality criteria designated in the PRX correspond to targets of the spot color and the barcode designated by the print data for the spot color and the barcode, respectively. This determination will be described with reference to the specific example of FIG. 8. From a result of analysis of print data, regarding a spot color, there is the spot color 802 whose name is "sc01" and Lab values are L=17.64167, a=1.076669, and b=0.3338588. There is also the spot color 803 whose name is "sc02" and RGB values are R=85, G=170, and B=119. Regarding a barcode, it can be seen that there is a barcode font whose standard is JAN.

Meanwhile, from a result of analysis of PRX, regarding a spot color, there is a print quality criterion for a spot color whose name is "sc01" and Lab values are L=17.64166, a=1.076666, and b=0.3338566. Regarding a barcode, it can be seen that there is a print quality criterion for a barcode whose image data name is "barcode.pdf" and whose standard is "JAN".

When these are compared, it can be determined that the spot color whose name is "sc02" is not defined in the PRX. When a print quality criterion for a spot color or a barcode present in the print data is not defined in the PRX in this way, it is determined No in step S605. Thus, when it is indicated that the result of analysis by the prepress processing unit 304 includes a spot color or a barcode, it is determined that there is in fact no corresponding print quality criterion based on the result of analysis by the PRX interpretation unit 303, and the processing proceeds to step S606. Alternatively, even if a print quality criterion is present, if it is determined that it does not correspond to a spot color or a barcode present in the print data, the processing proceeds to step S606. Meanwhile, when it is determined that the print quality criterion corresponds (Yes), the processing proceeds to step S617.

In step S606, the integrated control unit 302 displays a predetermined notification on a display unit such as a display apparatus of the workflow management terminal 101 in order to notify that there is an inconsistency between the print data and the PRX. This notification may be to notify that an object included in the print data and the PRX do not match. Alternatively, a form may be taken so as to issue a notification prompting confirmation of the PRX or simply notify that there is an error. In a warning screen (a notification screen) according to the present embodiment, it is possible to select whether to stop or continue the execution of the print job in accordance with user input. A detailed screen display is illustrated in a reference numeral 700 of FIG. 7A. Details of the screen 700 will be described later. Next, in step S607, the integrated control unit 302 receives input of an instruction from the workflow administrator and determines that input. When input is stop (Yes), the processing advances to step S608, and when it is not stop (No), the processing advances to step S609. Here, when the workflow administrator determines to modify the description content of the print quality criterion in the PRX without stopping the print job and then continue printing, the workflow administrator enters No. Alternatively, when the workflow administrator determines that it is better to have the end user determine whether to modify the PRX, the workflow administrator enters Yes.

In step S608, the integrated control unit 302 causes the data management unit 301 that stores the print job to hold an attribute that the PRX needs to be modified for the corresponding print job and temporarily stops the processing of the print job. Further, the integrated control unit 302 displays, on the display apparatus of the workflow management terminal 101 that the PRX for the corresponding print job needs to be modified. A detailed screen display is illustrated in a screen 710 of FIG. 7A. Details of the screen 710 will be described later. A display that the PRX for the corresponding print job needs to be modified is performed. After the display, the processing proceeds to step S618.

Step S609 and subsequent steps are processing in which the workflow management server 100 proposes candidates for content to be modified in order to have the workflow administrator modify the description content of the print quality criteria of the PRX.

In step S609, the integrated control unit 302 acquires, from the data management unit 301 in which the result of analysis obtained by the PRX interpretation unit 303 analyzing the PRX in step S603 is stored, the above result of analysis. Further, the integrated control unit 302 extracts all the print quality criteria of the spot color or the barcode from the acquired result of analysis and displays them on the display apparatus of the workflow management terminal 101 as selection items. Specifically, as described above, a case where the RGB or Lab values of the spot color data of the print data differs from that of the PRX due to a request for spot color modification from the customer during proofing before the actual printing is considered. A spot color of L=17.64167, a=1.076669, and b=0.3338588 of the prepress processing result of FIG. 8 are spot color values modified as a result of proofing. Meanwhile, the Lab values—

L=17.64166, a=1.076666, and b=0.3338566—defined in the PRX of FIG. 5 are unmodified spot color values from before proofing, and they are different. In this case, the MinimumAcceptableRank and DesiredRank values of the spot color for which the values L=17.64166, a=1.076666, and b=0.3338566, which differ from the Lab values of the spot color data of the print data, are defined are obtained and then indicated as selection items. A detailed screen display is illustrated in a reference numeral 720 of FIG. 7B.

Next, in step S610, the integrated control unit 302 receives input of an instruction from the workflow administrator and determines that input. If the input is selection of one or more of the selection items (Yes), the processing proceeds to step S616; if no selection is made and then cancellation is performed (No), the processing proceeds to step S611. In step S611, the integrated control unit 302 acquires, from the data management unit 301 in which the result of analysis obtained by the PRX interpretation unit 303 analyzing the PRX in step S603 is stored, the above result of analysis. Further, the integrated control unit 302 extracts all the print quality criteria other than those of the spot color or the barcode from the acquired result of analysis and displays them on the display apparatus of the workflow management terminal 101 as selection items. A detailed screen display is illustrated in a reference numeral 730 of FIG. 7B. Next, in step S612, the integrated control unit 302 receives input of an instruction from the workflow administrator and determines that input. If the input is selection of one or more of the selection items (Yes), the processing proceeds to step S616; if no selection is made and then cancellation is performed (No), the processing proceeds to step S613.

In step S613, the integrated control unit 302 retrieves a print quality criterion different from the analysis result obtained by analyzing the PRX stored in the data management unit 301, and displays them on the display apparatus of the workflow management terminal 101 as a selection item. A detailed screen display is illustrated in a reference numeral 750 of FIG. 7C. Another print quality criterion is, for example, a print quality criterion that a printing company operating this commercial printing system has as an in-house standard, or a print quality criterion for satisfying JapanColor, which is a standard of the printing industry. There may also be multiple print quality criteria. For example, ANSI, which is the standard for barcodes, has grades A through F, but a separate print quality criterion is kept so that appropriate criteria can be selected from these grades. Next, in step S614, the integrated control unit 302 receives input of an instruction from the workflow administrator and determines that input. If the input is selection of one or more of the selection items (Yes), the processing proceeds to step S616; if no selection is made and then cancellation is performed (No), the processing proceeds to step S615.

Since no alternative print quality criterion is selected in the above steps S610, S612, and S614, it means that an inconsistency between the print data and the PRX determined by the integrated control unit 302 in step S606 has not been resolved. Therefore, in step S615, the integrated control unit 302 determines that there is an error condition in which there is an inconsistency between the print data and the PRX again. Then, the processing returns to step S606, the above-described warning display is performed, and determination of the workflow administrator is sought after once again by accepting input of an instruction by the workflow administrator in step S607.

If one or more alternative print quality criteria are selected in the above steps S610, S612, and S614, in step S616, the integrated control unit 302 rewrites the print quality criteria selected for the PRX. Further, the integrated control unit 302 stores the rewritten PRX in the data management unit 301, replacing the previous PRX. The rewritten PRX is now consistent with the print data.

Figure 7C:
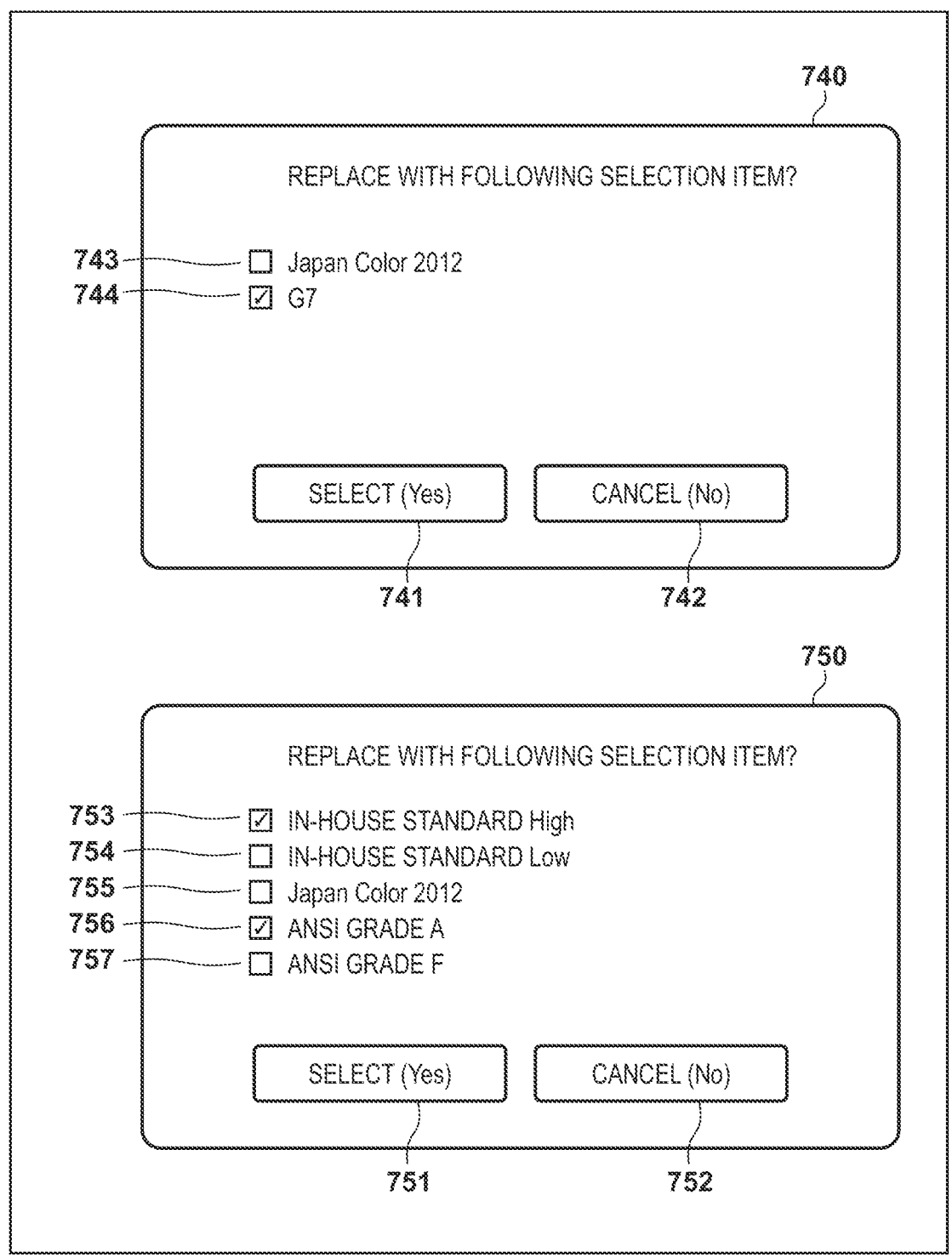
FIG. 7C is a diagram of screen displays of the workflow management terminal according to the embodiment.

Next, in step S617, the integrated control unit 302 records a series of processes described so far, the detected inconsistency or error content, a method for solving them, and the like as history information in a log, stores the log in the data management unit 301, and terminates the process. This history information may later be utilized to analyze errors in detail or may be utilized as learning data for when print quality criteria are presented to the user (FIGS. 7B and 7C).

Figure 6A:
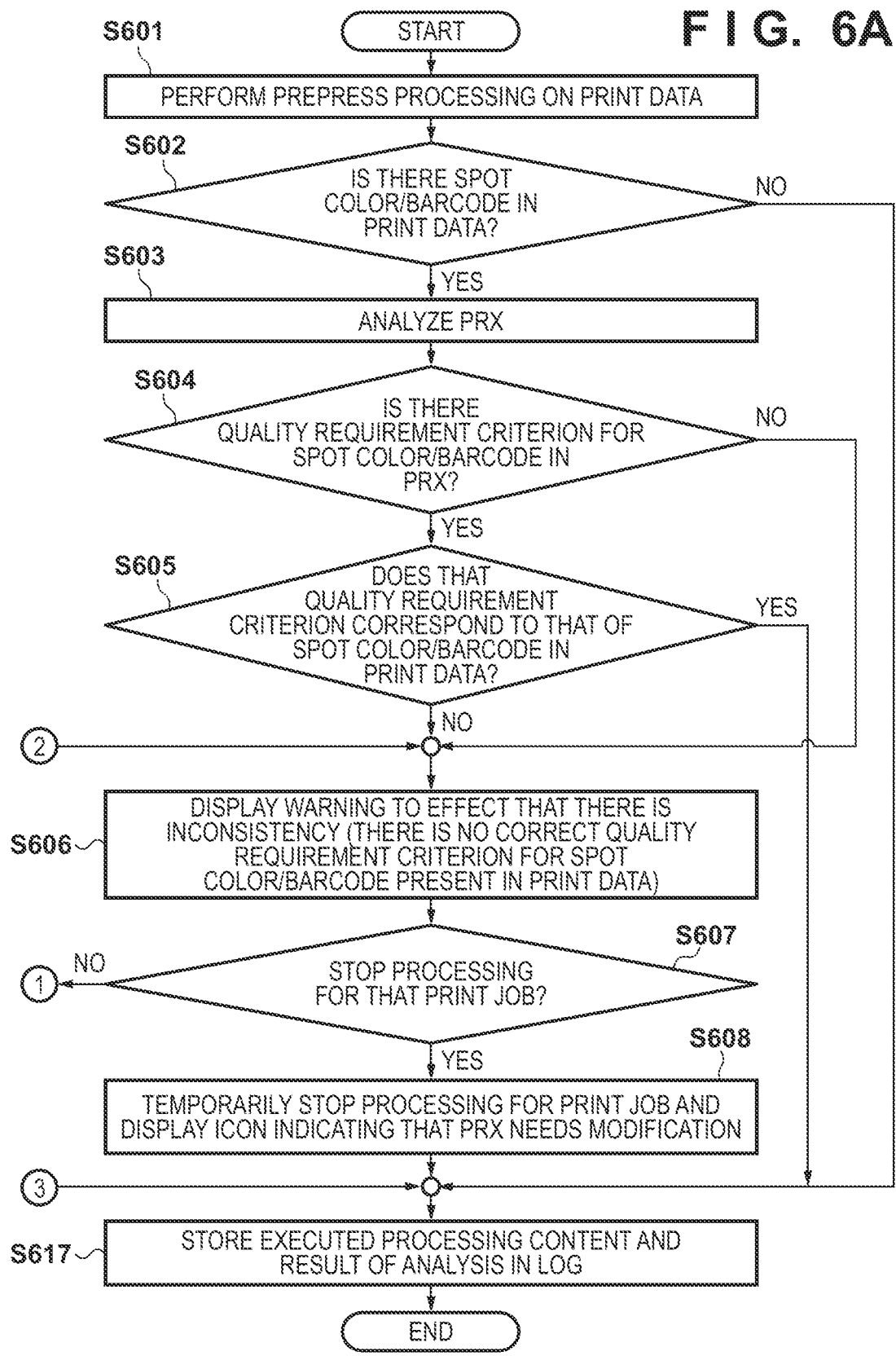
FIG. 6A is a flowchart according to the embodiment.
Figure 6B:
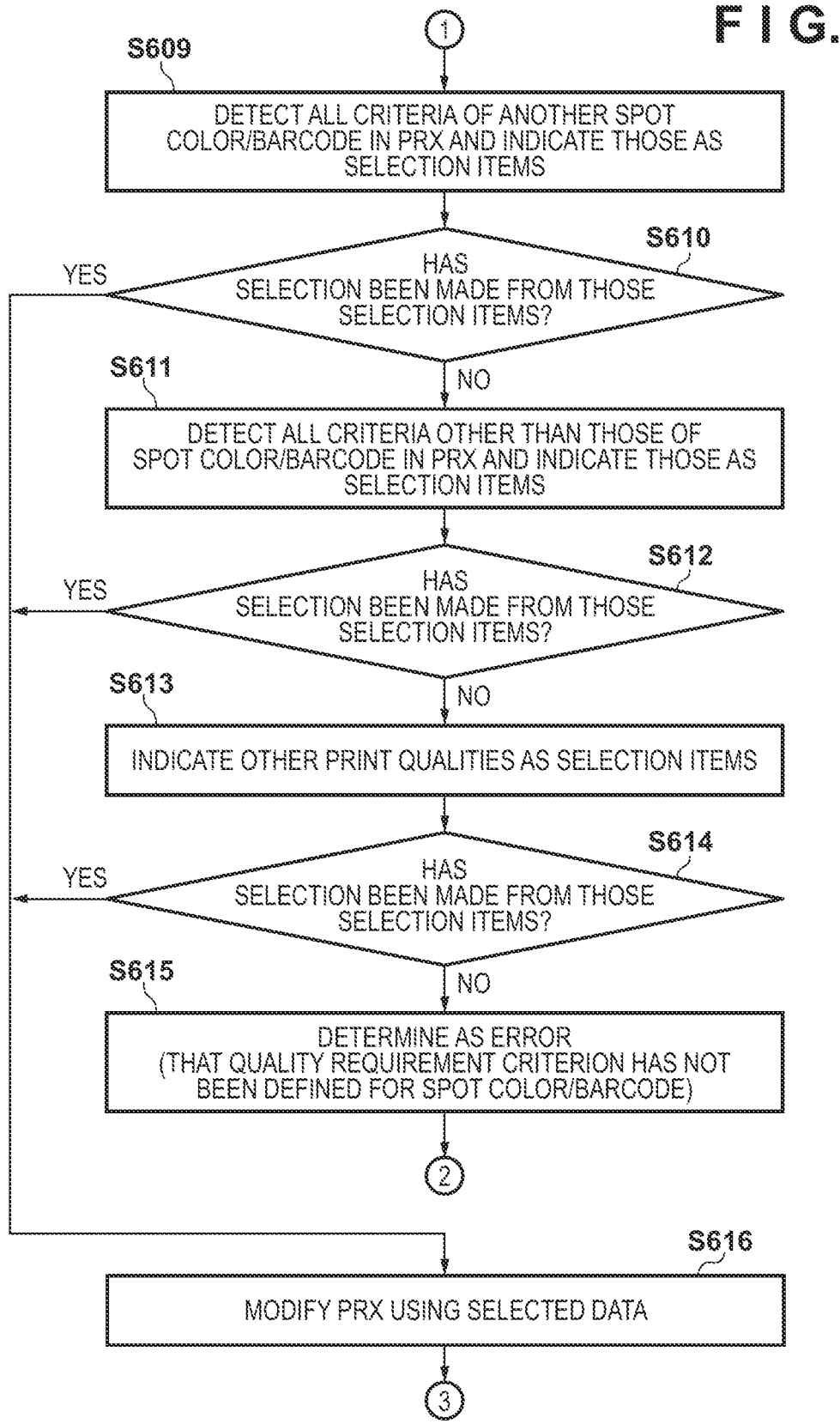
FIG. 6B is a flowchart according to the embodiment.

Although a description has been given assuming that the flowcharts of FIGS. 6A and 6B are processed by the workflow management server 100, the order reception system server 110 or the production system 120 may have the PRX interpretation unit 303 and the prepress processing unit 304 and execute the flowcharts. Further, the processing of the above step S601 or S603 described to be performed by the workflow management server 100 may be control in which processing is requested to the order reception system server 110 or the production system 120 having the PRX interpretation unit 303 and the prepress processing unit 304 and a result thereof is received. Thus it is possible to flexibly distribute the processing. Further, a configuration may be taken such that the integrated control unit 302 transmits warning information such as a warning screen to an external apparatus and perform a warning on the external apparatus.

<Screen Examples>

A description will be given for examples of a screen and an instruction input screen to be display on the workflow management terminal 101 described in the flowcharts of FIGS. 6A and 6B with reference to FIGS. 7A to 7C.

The reference numeral 700 in FIG. 7A is an example of a screen display displayed in step S606. The screen 700 displays a warning that an inconsistency has been detected and an input button for prompting the workflow administrator to enter whether to stop or continue the print job. A stop button 701 and a continue button 702 are displayed to be selectable as the input button.

The reference numeral 710 in FIG. 7A is an example of a screen display displayed in step S608. The screen 710 lists the print jobs and displays whether there is an inconsistency in a PRX for those jobs in an identifiable manner. For example, as illustrated in a reference numeral 711, a job name is indicated as "NG!" in a column of the PRX of "job001", so that it can be seen at a glance that there is an inconsistency in the PRX. If there is no inconsistency, "OK" is displayed as in other jobs. Also, "OK" or "NG!" is not displayed for the job name "job004", because there is no spot color or barcode in the print data or PRX.

The reference numeral 720 in FIG. 7B is an example of a screen display displayed in step S609. In the screen 720, all print quality criteria of the spot color extracted by analyzing the PRX in step S609 are displayed, and furthermore, a check box 723 is displayed so as to be selectable. As illustrated in FIG. 7B, the lowest rank 3 (target rank 4) is displayed as a selection item and it is indicated that the checkbox 723 is checked. The workflow administrator may instruct replacement by checking the box and then pressing a select (Yes) button 721. On the other hand, when a cancel (No) button 722 is pressed, it is possible to instruct not to perform replacement.

The reference numeral 730 in FIG. 7B is an example of a screen display displayed in step S609. In the screen 730, all print quality criteria of the barcode extracted by analyzing the PRX in step S609 are displayed, and a check box 733 is provided so as to enable selection therefrom. In FIG. 7B, JAN, which a barcode standard, is displayed as a selection item and it is indicated that the checkbox 733 is not checked. The workflow administrator may instruct replacement by checking the box and then pressing a select (Yes) button 731. On the other hand, when a cancel (No) button 732 is pressed, it is possible to instruct not to perform replacement.

A reference numeral 740 in FIG. 7C is an example of a screen display displayed in step S611. In the screen 740, all print quality criteria included in the PRX are displayed as a result of analysis of the PRX in step S609, and check boxes 743 and 744 are provided so as to enable selection therefrom. In FIG. 7C, Japan Color 2012 and G7 are displayed as selection items and it is indicated that the checkbox 744 for G7 is checked. The workflow administrator may instruct replacement by checking the box and then pressing a select (Yes) button 741. On the other hand, when a cancel (No) button 742 is pressed, it is possible to instruct not to perform replacement.

A reference numeral 750 in FIG. 7C is an example of a screen display displayed in step S613. In the screen 750, the integrated control unit 302 retrieves another print quality criterion stored in the data management unit 301 in step S613 and displays them, and check boxes 753 to 757 are provided so as to enable selection therefrom. In FIG. 7C, in-house standard High, in-house standard low. Japan Color 2012, ANSI grade A, and ANSI grade F are displayed as selection items. It is indicated that checkboxes 753 and 756 for in-house standard High and ANSI grade A are checked. The workflow administrator may instruct replacement by checking the box and then pressing a select (Yes) button 751. On the other hand, when a cancel (No) button 752 is pressed, it is possible to instruct not to perform replacement.

As described above, the information processing apparatus according to the present embodiment externally receives, as a print job, print data and a print quality criterion, analyzes the received print data, and then extracts an object for which a print quality criterion can be designated. The information processing apparatus also analyzes the received print quality criterion and, based on a result of the analysis, determines whether or not a print quality criterion corresponding to the extracted object is designated in the received print quality criterion. As a result of the determination, the information processing apparatus also performs a predetermined notification if a print quality criterion corresponding to at least one extracted object is not designated in the received print quality criterion. The present invention provides a mechanism for detecting, when there is an object in print data for which a print quality criterion is to be set but there is no corresponding requirement criterion in a print request, that inconsistency and outputting a warning. As described above, by virtue of the present embodiment, it is possible to detect, when there is an object in print data for which a print quality criterion is to be set but there is no corresponding requirement criterion in a print request, that inconsistency and outputting a warning. This makes it possible to prevent printing being performed without an appropriate print quality criterion being set for an object such as a spot color or a barcode for which a print quality criterion can be designated.

By virtue of the present invention, it is possible to prevent printing without an appropriate print quality criterion being set for an object such as a spot color or a barcode.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   at least one processor that causes the information processing apparatus to function as:
   a reception unit configured to externally receive print data and a print quality criterion as a print job;
   a prepress unit configured to analyze the print data received by the reception unit and extract an object for which a print quality criterion can be designated;
   an analysis unit configured to analyze the print quality criterion received by the reception unit;
   a determination unit configured to determine, based on a result of analysis by the analysis unit, whether or not a print quality criterion corresponding to the object extracted by the prepress unit is designated in the print quality criterion received by the reception unit; and
   a display unit configured to display, on a display of the information processing apparatus, a warning screen that warns that the print quality criterion corresponding to the at least one object extracted by the prepress unit is not designated in the print quality criterion received by the reception unit in a case where a print quality criterion corresponding to at least one object extracted by the prepress unit is not designated in the print quality criterion received by the reception unit as a result of determination by the determination unit,
   wherein, in the warning screen, it is possible to select whether to stop or continue of execution of the print job in accordance with a user input, and wherein, in a case where continuing of execution of the print job is selected via the warning screen, the display unit presents selectably one or more criteria that modifies the print quality criterion received by the reception unit.

2. The information processing apparatus according to claim 1, wherein in a case where stopping of execution of the print job is selected via the warning screen, the display unit displays a list of accepted print jobs and identifiably displays a print job for which there is an inconsistency between the print quality criterion and the print data received by the reception unit.

3. The information processing apparatus according to claim 1, wherein an object for which a print quality criterion can be designated is at least one of an object having a spot color and a barcode.

4. The information processing apparatus according to claim 1, wherein the print quality criterion received by the reception unit is defined in a Print Requirement eXchange format (a PRX).

5. The information processing apparatus according to claim 1, further comprising: a memory that stores, as history information, a result of analysis by the prepress unit and the result of analysis by the analysis unit.

6. The information processing apparatus according to claim 1, wherein the at least one processor causes the information processing apparatus to further function as: a transmission unit configured to transmit, to an external apparatus, warning information by the display unit.

7. A method of controlling an information processing apparatus, the method comprising:
externally receiving print data and a print quality criterion as a print job;
performing prepressing in which the received print data is analyzed and an object for which a print quality criterion can be designated is extracted;
analyzing the received print quality criterion;
determining, based on a result of the analyzing, whether or not a print quality criterion corresponding to the object extracted by the prepressing is designated in the received print quality criterion; and
displaying, on a display unit of the information processing apparatus, a warning screen that warns that the print quality criterion corresponding to the at least one object extracted by the prepressing is not designated in the received print quality criterion in a case where a print quality criterion corresponding to at least one object extracted by the prepressing is not designated in the received print quality criterion as a result of the determining,
wherein, in the warning screen, it is possible to select whether to stop or continue of execution of the print job in accordance with a user input, and
wherein, in a case where continuing of execution of the print job is selected via the warning screen, the display unit presents selectably one or more criteria that modifies the received print quality criterion.

8. A non-transitory computer-readable storage medium storing a program for causing a computer to execute a method of controlling an information processing apparatus, the method comprising:
externally receiving print data and a print quality criterion as a print job;
performing prepressing in which the received print data is analyzed and an object for which a print quality criterion can be designated is extracted;
analyzing the received print quality criterion;
determining, based on a result of the analyzing, whether or not a print quality criterion corresponding to the object extracted by the prepressing is designated in the received print quality criterion; and
displaying, on a display unit of the information processing apparatus, a warning screen that warns that the print quality criterion corresponding to the at least one object extracted by the prepressing is not designated in the received print quality criterion in a case where a print quality criterion corresponding to at least one object extracted by the prepressing is not designated in the received print quality criterion as a result of the determining,
wherein, in the warning screen, it is possible to select whether to stop or continue of execution of the print job in accordance with a user input, and
wherein, in a case where continuing of execution of the print job is selected via the warning screen, the display unit presents selectably one or more criteria that modifies the received print quality criterion.

\* \* \* \* \*